United States Patent
Zheng et al.

(10) Patent No.: US 11,452,970 B2
(45) Date of Patent: Sep. 27, 2022

(54) CALCIUM COBALT ZIRCONIUM PEROVSKITES AS OXYGEN-SELECTIVE SORBENTS FOR GAS SEPARATION

(71) Applicant: Research Triangle Institute, Research Triangle Park, NC (US)

(72) Inventors: Qinghe Zheng, Durham, NC (US); Marty Lail, Raleigh, NC (US); Shaojun Zhou, Cary, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 197 days.

(21) Appl. No.: 16/802,868

(22) Filed: Feb. 27, 2020

(65) Prior Publication Data

US 2020/0276536 A1 Sep. 3, 2020

Related U.S. Application Data

(60) Provisional application No. 62/812,010, filed on Feb. 28, 2019.

(51) Int. Cl.
*B01D 53/04* (2006.01)
*B01D 53/22* (2006.01)
*B01D 53/047* (2006.01)

(52) U.S. Cl.
CPC ......... *B01D 53/229* (2013.01); *B01D 53/047* (2013.01); *B01D 53/0462* (2013.01); *B01D 2252/10* (2013.01); *B01D 2253/1124* (2013.01); *B01D 2257/104* (2013.01)

(58) Field of Classification Search
None
See application file for complete search history.

(56) References Cited

U.S. PATENT DOCUMENTS

| | | | |
|---|---|---|---|
| 3,865,752 A | 2/1975 | Remeika et al. |
| 3,865,923 A | 2/1975 | Stephens |
| 3,884,837 A | 5/1975 | Remeika et al. |
| 3,885,977 A | 5/1975 | Lachman et al. |
| 3,897,367 A | 7/1975 | Lauder |
| 3,929,670 A | 12/1975 | Kudo et al. |
| 4,001,371 A | 1/1977 | Remeika et al. |
| 4,024,706 A | 5/1977 | Adawi et al. |

(Continued)

FOREIGN PATENT DOCUMENTS

| | | |
|---|---|---|
| EP | 0468127 A2 | 1/1992 |
| WO | 2018089964 A2 | 5/2018 |

OTHER PUBLICATIONS

Hamza, A. "Effect Of Coating Materials On The Oxygen Permeability And Stability Of The Asymmetric Ion Transport Membrane Ba0.5Sr0.5Co0.8Fe0.2O3-δ (BSCF)." Dissertation, May 2016, King Fahd University of Petroleum & Minerals, Dhahran, Saudi Arabia.
Klimkowicz, A., et al. "Oxygen storage capability in Co- and Fe-containing perovskite-type oxides." Solid State Ionics, vol. 257, 23-28 (2014). Elsevier B.V.

(Continued)

*Primary Examiner* — Philip Y Louie
(74) *Attorney, Agent, or Firm* — Olive Law Group PLLC; Nathan P. Letts

(57) ABSTRACT

The present disclosure provides methods to use calcium cobalt zirconium perovskites as oxygen-selective sorbents for the separation of oxygen from a gas mixture such as air. Systems and high temperature oxygen detectors are also provided. In a preferred embodiment, the perovskite is configured as a membrane.

20 Claims, 12 Drawing Sheets

(56) References Cited

U.S. PATENT DOCUMENTS

| | | | |
|---|---|---|---|
| 4,049,583 | A | 9/1977 | Lauder |
| 4,107,163 | A | 8/1978 | Donohue |
| 4,126,580 | A | 11/1978 | Lauder |
| 4,151,123 | A | 4/1979 | McCann, III |
| 4,250,146 | A | 2/1981 | Bailey |
| 4,321,250 | A | 3/1982 | Hart |
| 4,748,143 | A | 5/1988 | Tabata et al. |
| 5,318,937 | A | 6/1994 | Jovanovic et al. |
| 5,380,692 | A | 1/1995 | Nakatsuji et al. |
| 5,977,017 | A | 11/1999 | Golden |
| 6,680,036 | B1 | 1/2004 | Fisher et al. |
| 7,718,562 | B2 | 5/2010 | Gandhi et al. |
| 11,179,704 | B2 * | 11/2021 | Zheng ............ B01J 23/78 |
| 2004/0024071 | A1 | 2/2004 | Meier |
| 2008/0078675 | A1 * | 4/2008 | Kawahara ......... C01B 13/0255 |
| | | | 204/279 |
| 2011/0038783 | A1 * | 2/2011 | Satchell, Jr. ............. C09K 8/58 |
| | | | 423/437.1 |
| 2015/0060743 | A1 * | 3/2015 | Yashima ............. H01B 1/08 |
| | | | 252/62.51 R |

OTHER PUBLICATIONS

Mooney, J. "Emission Control, Automotive." In Kirk-Othmer Encyclopedia of Chemical Technology, John Wiley & Sons, Inc. (Ed.), United States, dated Nov. 19, 2004, 67 pages.

Ran, R., et al. "Oxygen storage capacity and structural properties of Ni-doped LaMnO3 perovskites." Journal of Alloys and Compounds, vol. 577, 288-294 (2013). Elsevier B.V.

Seymour, R. "Platinum-Group Metals." In Kirk-Othmer Encyclopedia of Chemical Technology, John Wiley & Sons, Inc. (Ed.), United States, dated Jan. 13, 2012, 37 pages.

De Costa, J. et al. "State of Art (SOTA) Report on Dense Ceramic Membranes for Oxygen Separation from Air." Aug. 12, 2013.

Sunarso, J., et al. "Perovskite oxides applications in high temperature oxygen separation, solid oxide fuel cell and membrane reactor: A review." Progress in Energy and Combustion Science, vol. 61, 57-77 (2017). Elsevier Ltd.

Zheng, Q., et al. "Part II: Oxidative Thermal Aging of Pd/Al2O3 and Pd/CexOy-ZrO2 in Automotive Three Way Catalysts: The Effects of Fuel Shutoff and Attempted Fuel Rich Regeneration." Catalysts, vol. 5, 1797-1814 (2015). MDPI, Basel, Switzerland.

* cited by examiner

CALCIUM COBALT ZIRCONIUM PEROVSKITES AS OXYGEN-SELECTIVE SORBENTS FOR GAS SEPARATION

CROSS REFERENCE TO RELATED APPLICATIONS

This application claims the benefit of U.S. Provisional Appn. No. 62/812,010 filed Feb. 28, 2019, Zheng et al., entitled "Calcium Cobalt Zirconium Perovskites as Oxygen-Selective Sorbents for Gas Separation", which is hereby incorporated by reference in its entirety.

STATEMENT REGARDING FEDERALLY SPONSORED RESEARCH OR DEVELOPMENT

This invention was made with government support under Grant Number FE0027995 awarded by the Department of Energy. The government has certain rights in the invention.

FIELD

The present disclosure provides methods to use calcium cobalt zirconium perovskites as oxygen-selective sorbents for the separation of oxygen from a gas mixture such as air. Systems and high temperature oxygen detectors are also provided. In a preferred embodiment, the perovskite is configured as a membrane.

BACKGROUND

Introduction

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Oxygen production is a multibillion dollar industry with applications in chemical production and manufacturing processes, and more recently in applications that involve clean energy production, such as integrated gasification combined cycle (IGCC), oxy-fuel combustion, and solid oxide fuel cells (SOFCs).[1-6] Air separation is mainly carried out by the following three types of unit operations: (1) cryogenic distillation, (2) membrane separation, and (3) $O_2$- or $N_2$-selective gas sorption.[5, 7] Cryogenic distillation is the most developed but energy intensive process, and is particularly useful for air separation on a large production scale.[4] Membrane and sorption processes are suitable for small- or medium-scale on-site production.[8] New oxygen sorbents/membranes based on oxygen-deficient dense ceramics (i.e. perovskites, fluorites and brownmillerite) can absorb considerable amount of oxygen at high temperatures (>700° C.), which have received increasing interest from industrial sector over the last two decades.[9, 10] It should be noted that for some applications including glass and steel industries, and combustion processes, it is desirable to supply oxygen at elevated temperature above 300° C.[4] In these cases, an air separation process including oxygen-selective sorption at high temperature is preferable because a single stream of high-purity (>99%) $O_2$ can be obtained by temperature-, pressure-swing, or combined sorption cycles, with $O_2$-deficient air as the only byproduct in a separate stream.

$ABO_{3-\delta}$ perovskites, where alkaline-earth or lanthanide elements occupy A site and transition metal elements occupy B site, are crystalline ceramics and are ideal for high temperature thermochemical air separation for oxygen production.[11] This is due to the fact that their oxygen non-stoichiometry $\delta$ can be varied in response to changes in temperature and oxygen partial pressure, as shown in Eq. (1).[3, 12] At high temperature and under a chemical potential gradient, perovskites reversibly store and release oxygen ions, which diffuse through the crystal lattice by hopping on/off oxygen vacancy defect sites.[9] Sorbent and membranes prepared based on this type of materials have an infinitely high selectivity (>99%) for oxygen over nitrogen or other non-oxygen gas species.[13, 14] However, the challenge remains to improve material performance by increasing oxygen sorption capacity while reducing operating temperatures to enable their effective use in air separation process.[1]

$$ABO_3 \xrightarrow{P_{O_2}, T} AMO_{3-\delta} + \frac{\delta}{2}O_2 \qquad \text{Eq. (1)}$$

The oxygen sorption capacity of the perovskites can be promoted by increasing the density of oxygen vacancies.[5] Theoretically, this can be achieved by incorporating bivalent metal cations (e.g. $Ba^{2+}$, $Sr^{2+}$, or $Ca^{2+}$) at A-site so that the total valence of cations is less than 6, and incorporating transition metal elements into the B-site.[11, 15] High basicity of B-site cations promotes the surface oxygen exchange reactions.[10] With transition metal $B^{3+}$ ions at B-sites, the $B^{3+}$ ions can be reduced to $B^{2+}$ upon thermochemical reduction, which results in formations of oxygen vacancies (structural defects),[16] as described in Kröger-Vink notation in Eq. (2), where $B_B^X$ is a $B^{3+}$ cation on $B^{3+}$ lattice position, $B'_B$ is $B^{2+}$ cation on a $B^{3+}$ lattice position, $O_O^X$ is a normal $O^{2-}$ ion in the perovskite lattice, $V_{\ddot{O}}$ is oxygen vacancy.

$$2B_B^X + O_O^X \rightleftharpoons 2B'_B V_{\ddot{O}} + 1/2 O_2(g) \qquad \text{Eq. (2)}$$

Perovskites with Co at B-sites showed high oxygen mobility, as Co showed stable oxidation states of both +3 and +2, allowing reversible oxygen vacancy formation. However, when $Co^{2+}$ was the only B-site cation, perovskites displayed poor thermal stability due to the high thermal expansion coefficient and phase transition at certain temperature.[17] One way to solve the trade-off between the oxygen mobility and chemical stability of perovskite materials is adding another metal ion(s) into the B-site.[19] To date, $Zr^{4+}$, $Ti^{4+}$, $Nb^{5+}$, $Bi^{5+}$, $Ce^{4+}$, and $Ta^{5+}$ have been proven to be the successful dopants to stabilize the oxygen vacancy-disordered perovskite lattice structure.[10, 18, 19]

Previously, the outstanding low temperature (<550° C.) redox property $CaCo_xZr_{1-x}O_{3-\delta}$ perovskite-type oxygen storage materials (OSMs) (in the presence of a fuel during reduction steps), and their potential application as oxidation catalysts for automotive emissions abatement, have been reported previously.[20]

The related OSMs and their uses for automobile applications have been disclosed in WO2018/089964 (Research Triangle Institute, Zheng et al.) published on May 17, 2018. However, WO2018/089964 does not disclose uses for high temperature oxygen separation or gas purification.

Sunarso et al. reviews the literature on perovskite oxide membranes for oxygen separation, solid oxide fuel cells and perovskite membrane reactors. Sunarso et al. 2017 Progress Energy Combustion Sci. 61 57-77.

da Costa et al. disclose barium strontium cobalt iron mixed oxides (BSCF) and lanthanum strontium cobalt iron mixed oxides (LSCF) for oxygen separation from air. They disclose configurations for ion transport membranes (ITMs). da Costa et al. Aug. 12, 2013 "State of Art (SOTA) Report on Dense Ceramic Membranes for Oxygen Separation from Air" Global CCS Institute available at http://decarboni.se/sites/default/files/publications/112031/sota-report-dense-ceramic-membranes-oxygen-separation-air.pdf accessed Jan. 25, 2019.

Hamza discloses perovskites as mixed ionic electronic conductors (MIECs) and ITMs. He discloses detailed studies of high temperature membranes with BSCF, specifically $Ba_{0.5}Sr_{0.5}Co_{0.8}Fe_{0.2}O_{3-\delta}$. Hamza, A. Effect of Coating Materials on the Oxygen Permeability and Stability of the Asymmetric Ion Transport Membrane $Ba_{0.5}Sr_{0.5}Co_{0.8}Fe_{0.2}O_{3-\delta}$ (BSCF), Ph.D. Thesis, King Fahd University of Petroleum & Minerals, Dhahran, Saudi Arabia, May 2016.

SUMMARY OF THE DISCLOSURE

The present disclosure provides a method for separating oxygen from a gas mixture which comprises (a) preparing an oxygen-depleted perovskite from a perovskite having the formula $CaCo_{1-x}Zr_xO_{3-\delta}$ wherein x is a number defined by $0.02 \leq x \leq 0.98$; and $\delta$ is a number defined by $0.0 \leq \delta \leq 1.0$; (b) contacting the oxygen-depleted perovskite under conditions such that the oxygen-depleted perovskite binds oxygen from the gas mixture and generates an oxygenated perovskite; (c) treating the oxygenated perovskite under suitable conditions so as to release the oxygen from the oxygenated perovskite; and thus (d) regenerating the oxygen-depleted perovskite and releasing the separated oxygen. The conditions to release the oxygen from the oxygenated perovskite may involve a pressure swing or a temperature swing. Preferably, the oxygenated perovskite is generated at a temperature of greater than 800° C.

The present disclosure also provides a system for the separation of oxygen from a gas mixture, the system comprising: (a) a reactor configured to prepare an oxygen-depleted perovskite from a perovskite having the formula $CaCo_{1-x}Zr_xO_{3-\delta}$ wherein x is a number defined by $0.02 \leq x \leq 0.98$; and $\delta$ is a number defined by $0.0 \leq \delta \leq 1.0$; (b) a device configured to contact the oxygen-depleted perovskite with the gas mixture to generate an oxygenated perovskite; (c) a device configured to treat the oxygenated perovskite to release the oxygen and generate an oxygen-depleted perovskite; and (d) a device configured to collect the released oxygen. The perovskite may be in a membrane such as a tubular membrane or a flat membrane. Alternatively, the reactor may be a fluidized bed reactor or a fixed bed reactor.

In addition, the disclosure provides a detector for oxygen in a gas mixture which comprises: (a) an oxygen-depleted perovskite from a perovskite having the formula $CaCo_{1-x}Zr_xO_{3-\delta}$ wherein x is a number defined by $0.02 \leq x \leq 0.98$; and $\delta$ is a number defined by $0.0 \leq \delta \leq 1.0$; (b) a device configured to contact the oxygen-depleted perovskite with the gas mixture and, if oxygen is present, to generate an oxygenated perovskite; (c) a means for detecting the oxygenated perovskite if present.

BRIEF DESCRIPTION OF THE FIGURES

FIG. 1-2: In situ thermal XRD patterns of $CaCo_xZr_{1-x}O_{3-\delta}$ (x=0.5) at selected temperatures during heating and cooling in $N_2$. Matching PDF patterns were plotted at the bottom for comparison.

FIG. 1-3: In situ thermal XRD patterns of $CaCo_xZr_{1-x}O_{3-\delta}$ (x=0.5) at selected temperatures during heating and cooling in air. Matching PDF patterns were plotted at the bottom for comparison.

FIG. 1-4: In situ thermal XRD patterns of $CaCo_xZr_{1-x}O_{3-\delta}$ (x=0.7) at selected temperatures during heating and cooling in $N_2$. Matching PDF patterns were plotted at the bottom for comparison.

FIG. 1-5: In situ thermal XRD patterns of $CaCo_xZr_{1-x}O_{3-\delta}$ (x=0.7) at selected temperatures during heating and cooling in air. Matching PDF patterns were plotted at the bottom for comparison.

FIG. 1-6: In situ thermal XRD patterns of $CaCo_xZr_{1-x}O_{3-\delta}$ (x=0.9) at selected temperatures during heating and cooling in $N_2$. Matching PDF patterns were plotted at the bottom for comparison.

FIG. 1-7: In situ thermal XRD patterns of $CaCo_xZr_{1-x}O_{3-\delta}$ (x=0.9) at selected temperatures during heating and cooling in air. Matching PDF patterns were plotted at the bottom for comparison.

FIG. 2. $CO_2$ MS signals during CO-TPR tests with $CaCo_xZr_{1-x}O_{3-\delta}$ perovskite samples from ambient temperature (25° C.) to 900° C. in 20% CO-Helium.

FIG. 3. TGA oxygen sorption by novel $CaCo_xZr_{1-x}O_{3-\delta}$ perovskites ((a) x=0.7 and (b) x=0.9) at different temperature and oxygen partial pressure $p(O_2)$ conditions.

FIG. 4. Thermal oxygen absorption-desorption cycle (100 cycles, 5 min for both absorption and desorption step) tests by novel $CaCo_xZr_{1-x}O_{3-\delta}$ perovskites ((a) x=0.7 or (b) x=0.9) at 700, 800, 900 or 1000° C. Oxidation was performed in air and reduction was performed in Ar.

FIG. 5. Thermal oxygen absorption-desorption cycle (500 cycles, 2 min for both absorption and desorption step) tests by novel $CaCo_{0.9}Zr_{0.1}O_{3-\delta}$ perovskite at 900° C. Oxidation was performed in air and reduction was performed in Ar.

FIG. 6. Schematic process of thermochemical air separation for $O_2$ production using $CaCo_xZr_{1-x}O_{3-\delta}$ perovskites.

DETAILED DESCRIPTION OF THE DISCLOSURE

Figure 1:
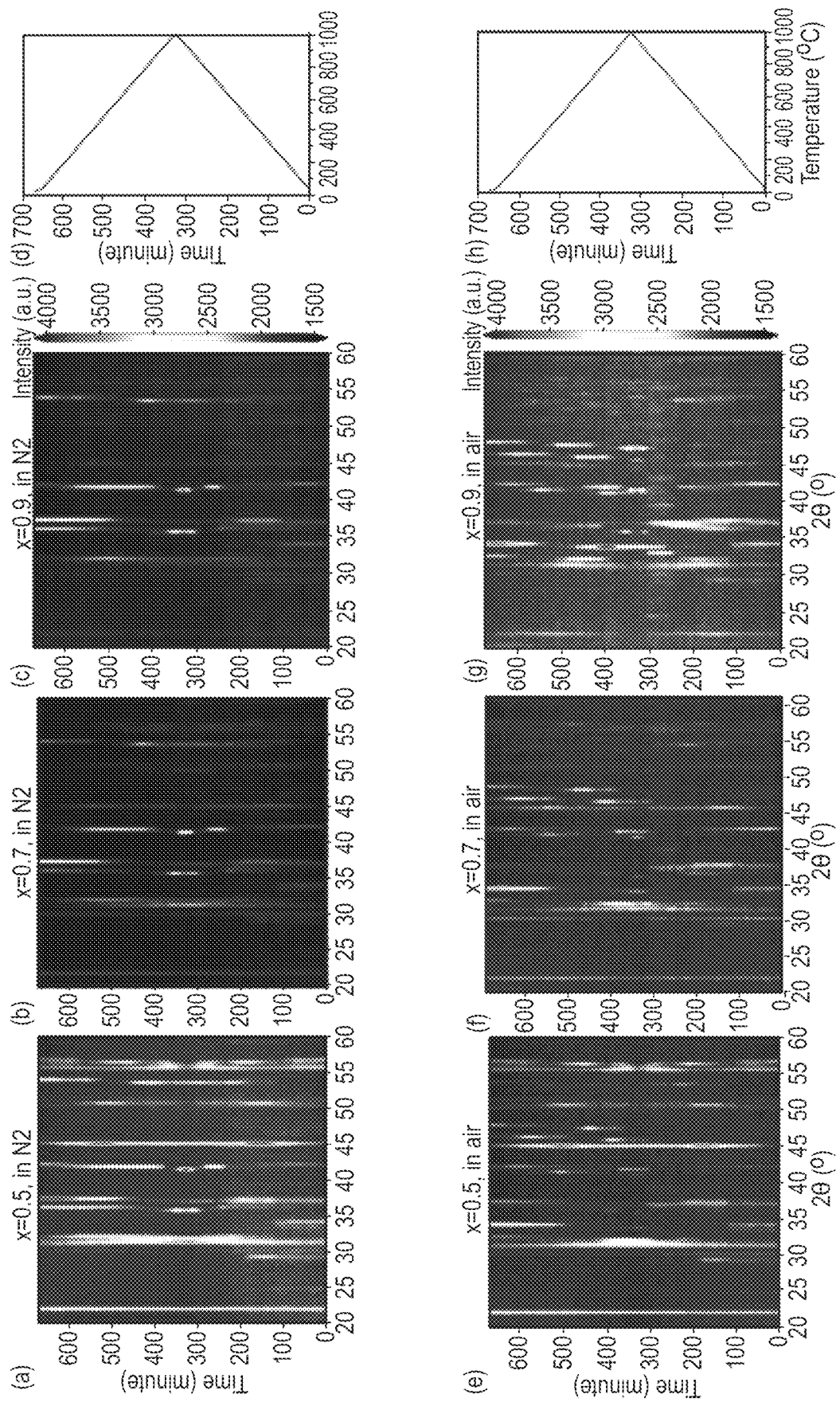
FIG. 1-1. In situ thermal XRD patterns in contour plots of $CaCo_xZr_{1-x}O_{3-\delta}$ with different Co contents and measuring conditions during temperature programmed heating and cooling between room temperature (25° C.) and 1000° C. Panel (a) $CaCo_{0.5}Zr_{0.5}O_{3-\delta}$ measured in pure $N_2$ flow, Panel (b) $CaCo_{0.7}Zr_{0.3}O_{3-\delta}$ measured in pure $N_2$ flow, Panel (c) $CaCo_{0.9}Zr_{0.1}O_{3-\delta}$ measured in pure $N_2$ flow, Panel (d) $CaCo_{0.5}Zr_{0.5}O_{3-\delta}$ measured in air flow, Panel (e) $CaCo_{0.7}Zr_{0.3}O_{3-\delta}$ measured in air flow, and Panel (f) $CaCo_{0.9}Zr_{0.1}O_{3-\delta}$ measured in air flow.

Abstract $ABO_{3-\delta}$ perovskites are ideal for high temperature thermochemical air separation for oxygen production, due to the fact that their oxygen nonstoichiometry $\delta$ can be varied in response to changes in temperature and oxygen partial pressure. This disclosure reports outstanding oxygen sorption performance of $CaCo_xZr_{1-x}O_{3-\delta}$ perovskites and their potential application as oxygen-selective sorbents for air separation. In situ thermal XRD was used to study the material structural changes in response to temperature variations in air or inert atmosphere. Temperature programmed reduction was employed to elucidate the relationship between perovskite composition and redox property. $O_2$ sorption performance was evaluated by isothermal study at various temperature and oxygen partial pressure conditions, as well as long-term absorption-desorption cycle tests. High oxygen sorption capacity was mainly attributed to B-site Co, while partial substitution of Co by Zr enhanced the perovskite structural crystallinity and thermal stability. Stable oxygen production as high as 2.87 wt % was observed at 900° C. during 5 minutes-sorption cycles for 100 cycles.

Unlike previous disclosures, these materials are for use at temperatures greater than 800° C. In other words, these methods are at temperatures more than 200° C. higher than automotive applications. Also, unlike automotive applications, these perovskites are not doped with metal catalysts, such as platinum, palladium or rhodium. Lastly, the uses disclosed herein are to reversible absorption of oxygen into the perovskite, they are not catalysts. In many automotive and industrial disclosures, perovskites chemically catalyse reactions, such as reacting hydrocarbons with oxygen to form water or carbon dioxide in the automobile applications.

In a preferred embodiment, the perovskites are configured in a membrane for high temperature oxygen separation. The configuration may be a tubular configuration, e.g., hollow fibers, or capillaries. Alternatively, the membrane may be configured in a flat arrangement such as the planer wafer ceramic membrane stacks prepared by Air Products & Chemicals. Examples of such configurations may be found in the literature. See da Costa et al. 2013, Sunarso et al. 2017 and Hamza 2016. The contents of which are hereby incorporated by reference in their entireties.

Definitions

While the following terms are believed to be well understood by one of ordinary skill in the art, the following definitions are set forth to facilitate explanation of the presently disclosed subject matter.

The term "absorption" means uptake of a gas component, e.g. oxygen, by a perovskite to fill its oxygen vacancies.

The term "desorption" means release of a gas component, e.g. oxygen, from a perovskite lattice accompanied by formation of oxygen vacancies in the perovskite lattice.

The term "oxygen nonstoichiometry", denoted as $\delta$, is defined as number of oxygen atoms deficient/missing in an otherwise uniform perovskite crystal lattice with stoichiometric oxygen present in the lattice.

The term "oxygen vacancy" means an oxygen atom is missing from one of the perovskite crystal lattice in the otherwise uniform stoichiometric perovskite crystal lattice.

The term "perovskite" means a metal oxide of the formula $ABO_{3-\delta}$ or $A^1A^2B^1B^2O_{3-\delta}$ having a cubic crystalline form. The cations A and B are metals that may have multiple valence states and are stable in both octahedral and dodecahedral environments.

The term "sorbent" means a material designed to selectively absorb a specific gas component for the purpose of gas separation.

Throughout the present specification, the terms "about" and/or "approximately" may be used in conjunction with numerical values and/or ranges. The term "about" is understood to mean those values near to a recited value. For example, "about 40 [units]" may mean within ±25% of 40 (e.g., from 30 to 50), within ±20%, ±15%, ±10%, ±9%, ±8%, ±7%, ±6%, ±5%, ±4%, ±3%, ±2%, ±1%, less than ±1%, or any other value or range of values therein or there below. Alternatively, depending on the context, the term "about" may mean ±one half a standard deviation, ±one standard deviation, or ±two standard deviations. Furthermore, the phrases "less than about [a value]" or "greater than about [a value]" should be understood in view of the definition of the term "about" provided herein. The terms "about" and "approximately" may be used interchangeably.

Throughout the present specification, numerical ranges are provided for certain quantities. It is to be understood that these ranges comprise all subranges therein. Thus, the range "from 50 to 80" includes all possible ranges therein (e.g., 51-79, 52-78, 53-77, 54-76, 55-75, 60-70, etc.). Furthermore, all values within a given range may be an endpoint for the range encompassed thereby (e.g., the range 50-80 includes the ranges with endpoints such as 55-80, 50-75, etc.).

As used herein, the verb "comprise" as used in this description and in the claims and its conjugations are used in its non-limiting sense to mean that items following the word are included, but items not specifically mentioned are not excluded.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

The following Examples further illustrate the disclosure and are not intended to limit the scope. In particular, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

EXAMPLES

In the present disclosure, the thermochemical oxygen mobility within perovskite materials was examined at higher temperature regime (600 to 1000° C.). The current study demonstrates that by tailoring $CaCo_xZr_{1-x}O_{3-\delta}$ perovskite compositions through B-site doping with appropriate amount of Zr, the oxygen storage/release capacity and material thermal stability at high temperature may be optimized for that of interest to air separation applications.

Previous ambient powder XRD result showed the as-synthesized $CaCo_xZr_{1-x}O_{3-\delta}$ perovskites shared main phase of orthorhombic Lakargiite $CaZrO_3$ perovskite matrix, while the perovskite crystallinity increased with with decreasing Co content (x value reduced from 0.9 to 0.3).[20] For high temperature air separation application, information about material structural changes in response to thermal and atmospheric conditions is useful. FIG. 1-1 shows in situ thermal XRD patterns of fresh $CaCo_xZr_{1-x}O_{3-\delta}$, (x=0.5, 0.7, or 0.9) measured either in $N_2$ ((a)-(c)) or air ((e)-(g)) during temperature programmed heating and cooling in between room temperature (25° C.) and 1000° C. To better understand the result, same XRD patterns at selected temperatures of interest were plotted in FIG. 1-2-1-7.

For $CaCo_{0.5}Zr_{0.5}O_{3-\delta}$ (x=0.5), orthorhombic lakargiite structure was maintained between 25° C. and 400° C. in both $N_2$ and air. As shown in FIG. 1-1, panel (a) and FIG. 1-2, when sample was treated with $N_2$ at increasing temperature to 607° C., peaks slightly shifted to lower angles, indicating thermal expansion of the perovskite crystal lattice.[21] Further increase of sample temperature to 1000° C. resulted in not only aggregated thermal expansion, but also leaching out of Co species from perovskite structure and formation of an additional CoO phase, which was associated with loss of lattice oxygen (β-desorption of oxygen), and formation of oxygen vacancies. The could result from the reduction of lattice Co ions to its unstable lower valence states, which occurred in order to maintain charge neutrality within perovskite lattice. The reduction of $Co_{Co}^X$ species accompanied by formation of oxygen vacancies in $CaCo_{0.5}Zr_{0.5}O_{3-\delta}$ perovskite lattice at T>607° C. in $N_2$ can be described in Eq. (3). In a subsequent cooling step, the peaks back-shifted to higher angles, indicating lattice contraction. However, the CoO particles were not able to re-dissolve into the main perovskite structure in $N_2$, and remained a separate phase till the sample was cooled to ambient temperature.

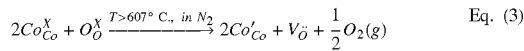

$$2Co_{Co}^X + O_O^X \xrightarrow{T>607° C., \text{ in } N_2} 2Co'_{Co} + V_{\ddot{O}} + \frac{1}{2}O_2(g) \qquad \text{Eq. (3)}$$

Figures 1, 2:
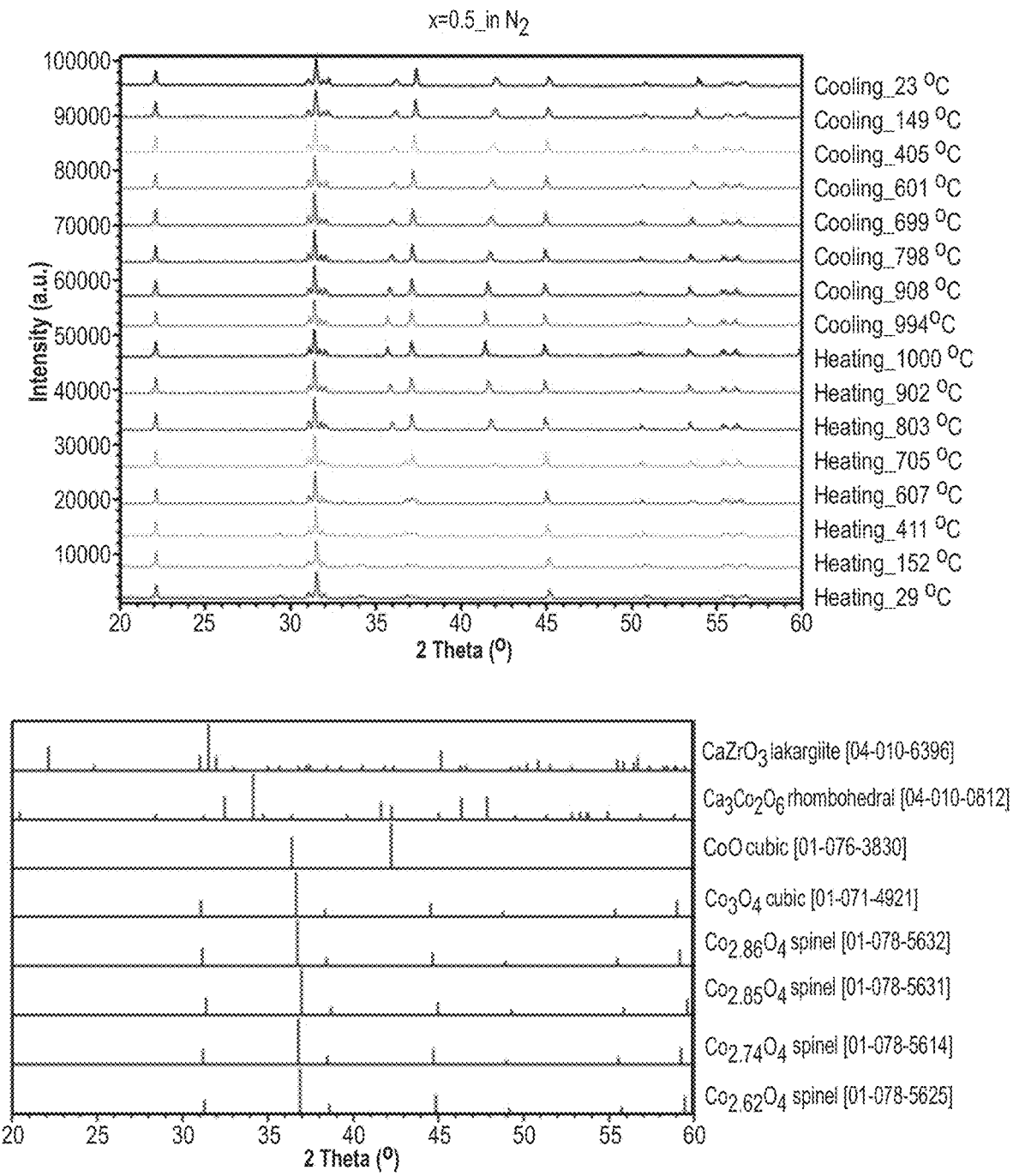
Figures 1, 2, 3:
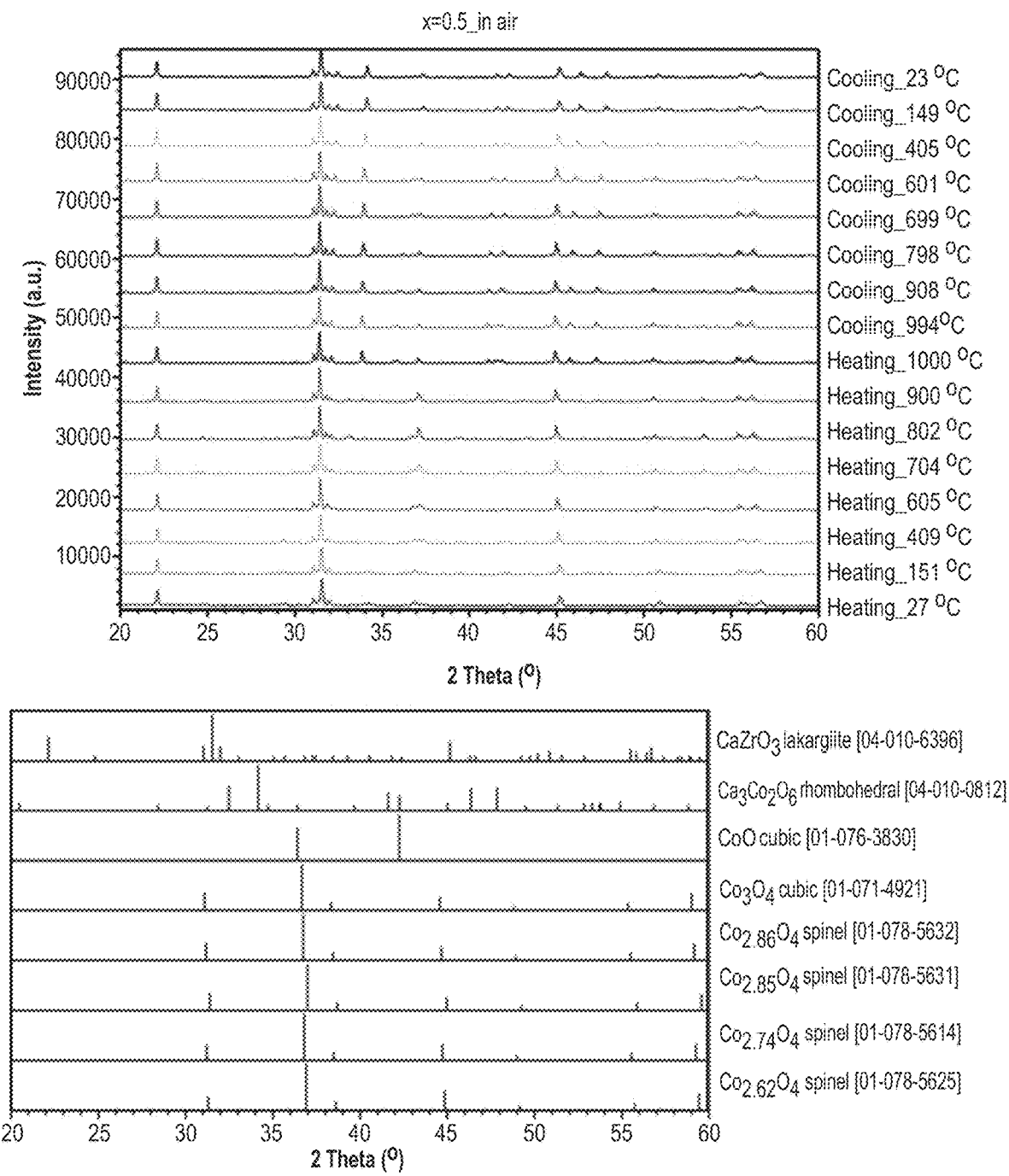

When the sample was treated with the same heating and cooling procedures but in flowing air (FIG. 1-1 panel (e) and FIG. 1-3), material structural expansion and contraction were also observed during heating and cooling steps. At lower temperature, no significant phase transition was observed. At higher temperature starting from around 901° C., a new $Ca_3Co_2O_6$ rhombohedral phase was formed, mainly due to the oxidation of perovskite lattice Co ions to its higher valence states, as shown in Eq. (4). Further cooling in air was not able to reverse the transition.

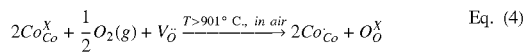

$$2Co_{Co}^X + \frac{1}{2}O_2(g) + V_{\ddot{O}} \xrightarrow{T>901° C., \text{ in air}} 2Co'_{Co} + O_O^X \qquad \text{Eq. (4)}$$

When x=0.7, higher content of segregated CoO phase was observed at ambient temperature. Increase of perovskite crystallinity was observed when sample temperature was ramped to 1000° C. in $N_2$ (FIG. 1-1 panel (b) and FIG. 1-4). Again, starting from as low as around 607° C., obvious phase separation of CoO from perovskite structure was observed, and became more significant as temperature further increased. When treated in air (FIG. 1 panel (f) and FIG. 1-5), increased perovskite crystallite size was obtained with increasing temperature. At temperature above 901° C., mixed phases of lakargiite perovskite and rhombohedral $Ca_3Co_2O_6$ structures were formed.

For $CaCo_{0.9}Zr_{0.1}O_{3-\delta}$ (x=0.9), mixed phases including lakargiite perovskite, $Ca_3Co_2O_6$ rhombohedral, and CoO cubic structures were all present at ambient condition. In $N_2$ above 900° C., $Ca_3Co_2O_6$-type rhombohedral phase disappeared, with only the remaining two phases left (FIG. 1, panel (c) and FIG. 1-6). In contrast, in air starting from 900° C., cubic CoO phase disappeared, with perovskite lakargiite and $Ca_3Co_2O_6$ rhombohedral phases left at higher temperature (FIG. 1-1 panel (g) and FIG. 1-7).

In air with increasing temperature, Co species tended to segregate back into the perovskite phase. The presence of Zr allowed main $Ca_7rO3$ lakargiite structure to be retained.

CO-TPR was employed to examine the reducibility of the B-site metals in the studied perovskites, as shown in FIG. 2, which showed MS 44 ($CO_2$ signals) as a function of time on stream. For $CaCo_xZr_{1-x}O_{3-\delta}$ perovskite samples, initial reductions were observed at around 350° C.~400° C., which can be ascribed to the reduction of $Co^{4+}$ or $Co^{3+}$ to $Co^{2+}$.[22] A simple thermodynamic estimation of the standard reaction enthalpy change $\Delta_r H^0$ for $Co^{4+}$ to $Co^{2+}$ and $Co^{3+}$ to $Co^{2+}$ were respectively 0.950 eV and 0.526 eV per Co atom (calculated by using standard formation energies $\Delta_f H^0$ of $Co_xO_y$), indicating the former reduction reaction is more endothermic, which corresponds to higher reduction temperature. The peaks shifted to lower reduction temperature as Zr content increased, suggesting enhanced Co reducibility by Zr doping, which was consistent with the thermal XRD result. Such donor-type doping may have resulted in the formation of more oxygen vacancies in the perovskite lattice, and the lowering of the oxidation state of local Co ions, for maintaining the charge-valence balance. The substitution of Co by Zr in $CaCo_xZr_{1-x}O_{3-\delta}$ structure can be represented by Eq. (5).

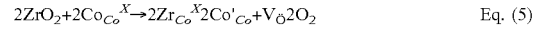

$$2ZrO_2 + 2Co_{Co}^X \rightarrow 2Zr_{Co}^{X}2Co'_{Co} + V_{\ddot{O}}2O_2 \qquad \text{Eq. (5)}$$

Moreover, small side peaks were observed at 400° C.~450° C., and became broader with increasing Zr content. These peaks may be ascribed to the reduction of segregated $Co_3O_4$ phases ($Co^{3+}Co^{2+}$ to $Co^{2+}$, with estimated $\Delta_r H^0$ of around 0.680 eV/Co atom).[22] The subsequent broader reduction peaks at higher temperatures between 500° C. and 750° C. were assigned to consecutive reduction of $Co^{2+}$ to $Co^0$ (with estimated $\Delta_r H^0$ of around 2.464 eV/Co atom).

It can be summarized that Zr doping significantly enhanced the crystallinity of $CaCo_{0.9}Zr_{0.1}O_{3-\delta}$ perovskite structure at room temperature. Oxygen sorption/release were accompanied by phase transitions/separations at temperature higher than 600° C. In $N_2$ with increasing temperature from 600° C. to 1000° C., CoO phase tended to leach out from the perovskite main phase.

FIG. 3 shows TGA oxygen sorption test result with $CaCo_{0.7}Zr_{0.3}O_{3-\delta}$ (x=0.7) and $CaCo_{0.9}Zr_{0.1}O_{3-\delta}$ (x=0.9) in responses to variations in temperature and oxygen partial pressure $p(O_2)$ from 0 to 1 atm. At a fixed $p(O_2)$, each fresh sample was treated by fast temperature ramping and subsequent isothermal gas sorption at respectively 600, 700, 800, 900, and 1000° C., followed by cooling in reverse order. It should be noted that the samples were rapidly heated to 600° C. before the sorption measurements. During heating test, when $p(O_2)=0$ (pure Ar feed), both samples experienced maximum weight losses as temperature increased to 800° C. (2.09 wt % and 2.44 wt % respectively for x=0.7 and x=0.9). As $p(O_2)$ increased to 0.5 atm, oxygen absorption-desorption equilibrium shifted to forward sorption direction at T<900° C. Further increase of $p(O_2)$ and decrease of T both favored sorption (oxidation). When T>900° C., desorption (thermal reduction) began to prevail. Lower $p(O_2)$ and higher T both favored desorption. Hysteresis was found during cooling process. The sorption isotherms measured at $p(O_2)=0$ (bottom brown lines) and x=0.2 (light blue lines) were of special interest, for mimicking vacuum desorption and air sorption conditions in a real air separation process.

At fixed temperature above 700° C., when p(O$_2$) increased from 0 to 0.2, higher weight gain was observed with sample having higher Co content (x=0.9 rather than 0.7).

Figures 1, 2, 3, 4:
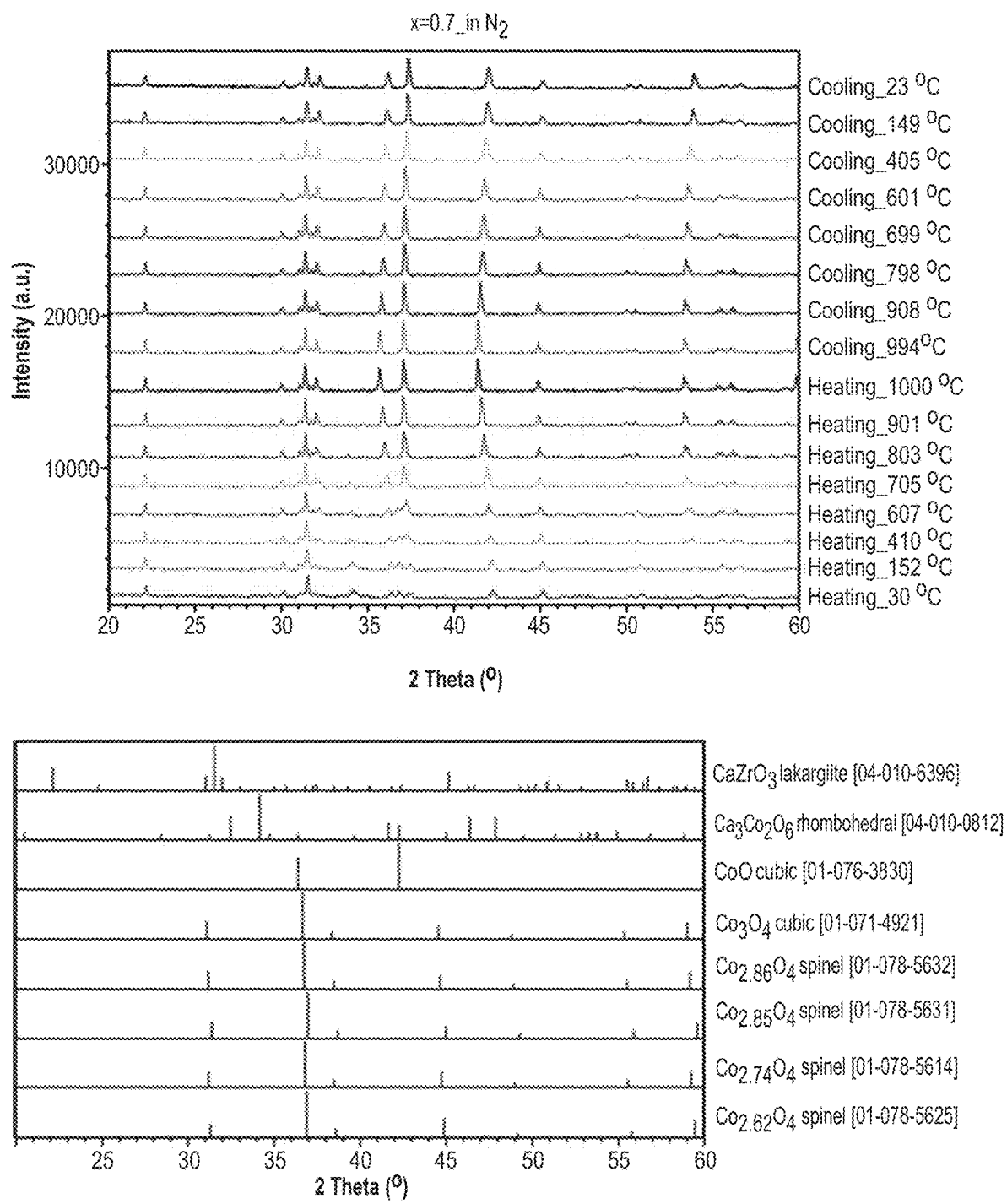

The stability of CaCo$_x$Zr$_{1-x}$O$_{3-\delta}$ perovskites (x=0.7 and x=0.9) were examined by thermal oxygen absorption-desorption cycle tests (100 cycles) at 700, 800, 900, and 1000° C., as shown in FIG. 4. The absorption and desorption temperature were kept the same and the sorption duration were both 5 minutes. For both perovskites samples, maximum O$_2$ sorption capacity were observed at 900° C., respectively 2.58 wt % and 2.87 wt % for x=0.7 and x=0.9. It was observed that at 900° C., stable material performance was established in around 30 of sorption cycles. At 800° C., stable material performance was reached in around 10 cycles, and maximum O$_2$ sorption capacity was observed 1.19 wt % and 1.52 wt %, respectively for x=0.7 and x=0.9. Compared to 800-900° C., significantly lower O$_2$ sorption capacity was observed at 700° C. and 1000° C.

Figures 1, 2, 3, 4, 5:
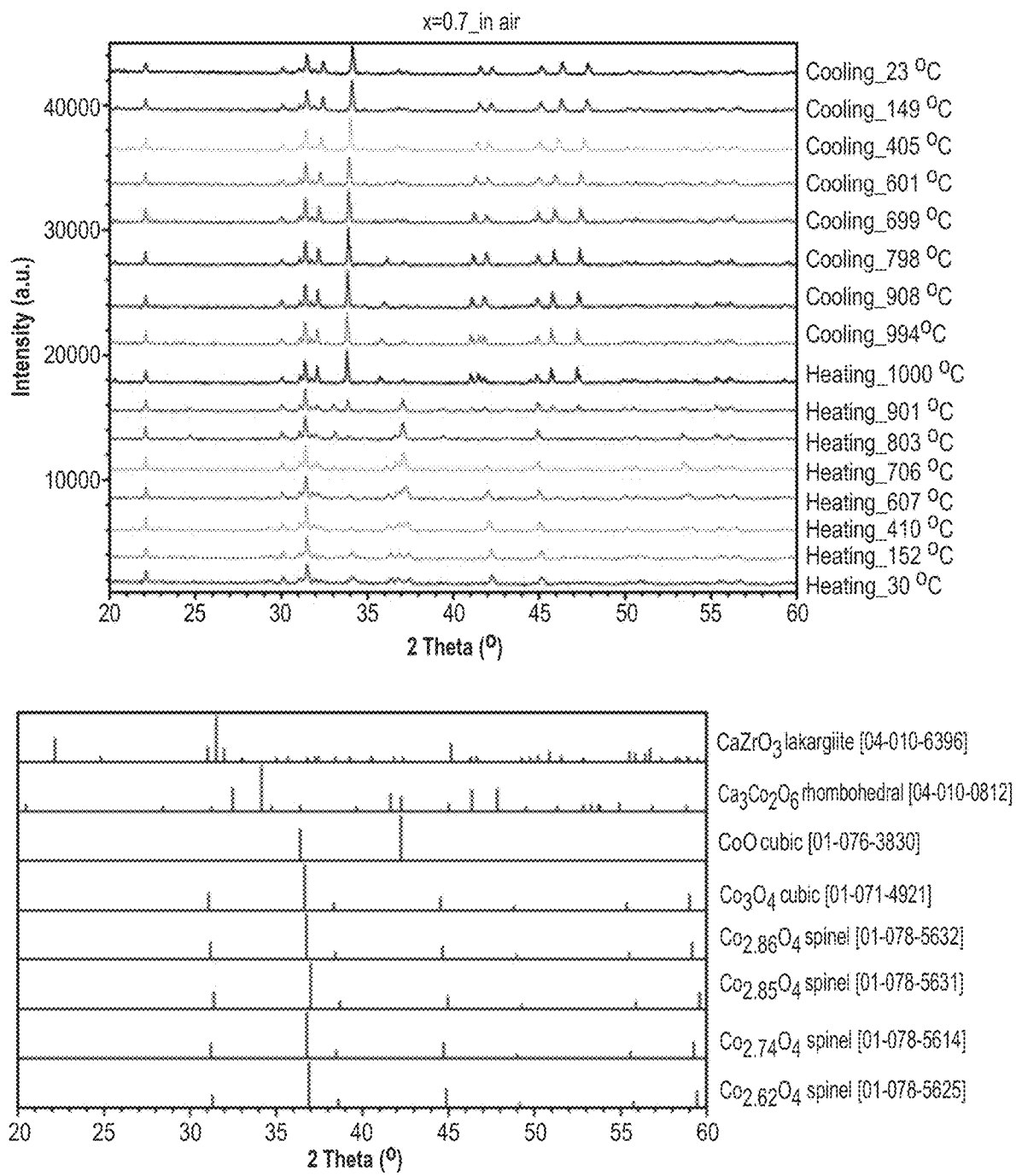

With both the absorption and desorption step durations reduced from 5 min to 2 min, a long thermal cycle test (500 cycles) was performed with CaCo$_{0.9}$Zr$_{0.1}$O$_{3-\delta}$ perovskite at 900° C., as shown in FIG. 5. Stable material performance was reached after 70-80 cycles, and sustained for the rest of the sorption cycles. A maximum O$_2$ sorption capacity of 0.95 wt % was observed.

Figures 1, 2, 3, 4, 5, 6:
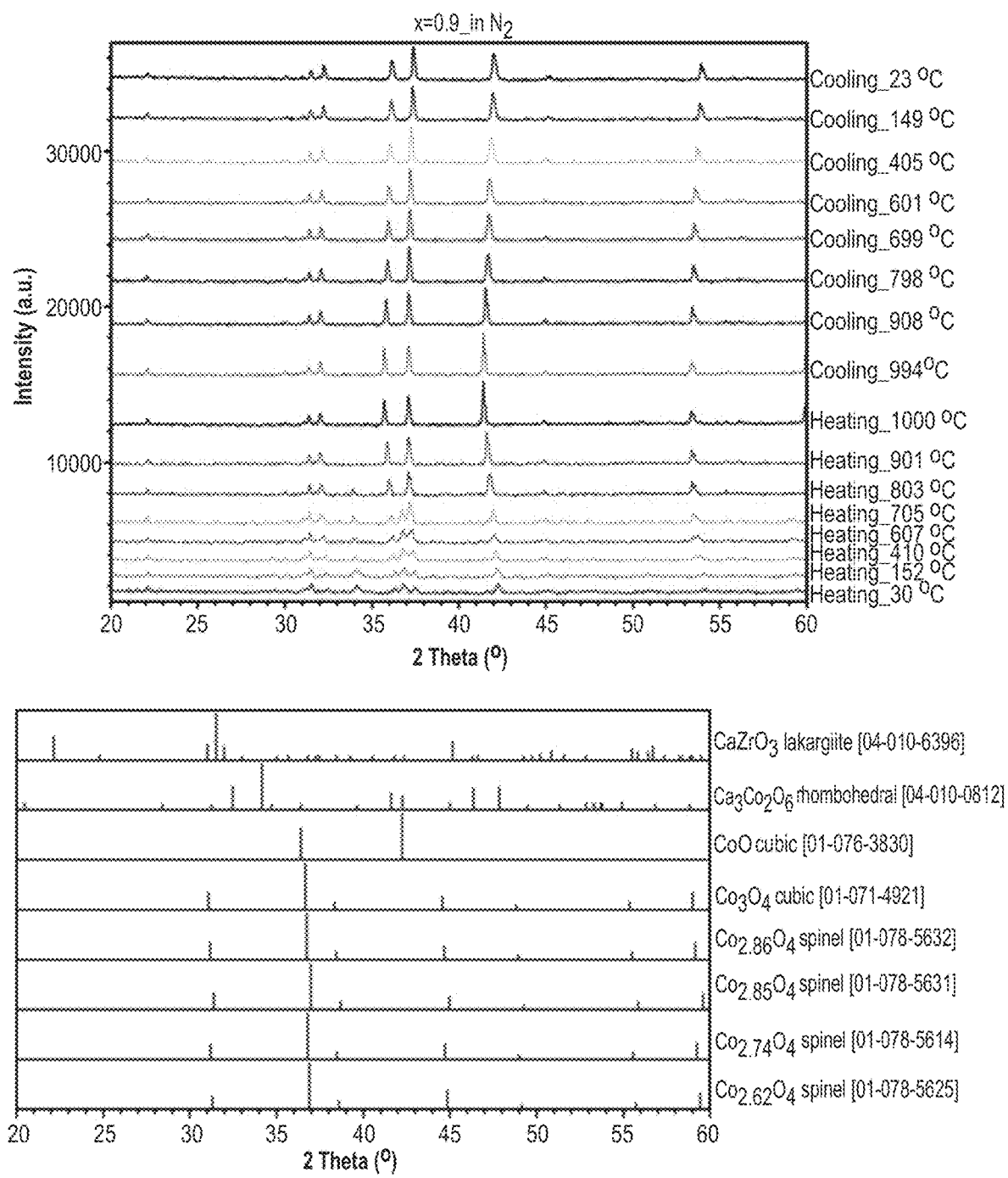
Figures 1, 2, 3, 4, 5, 6, 7:
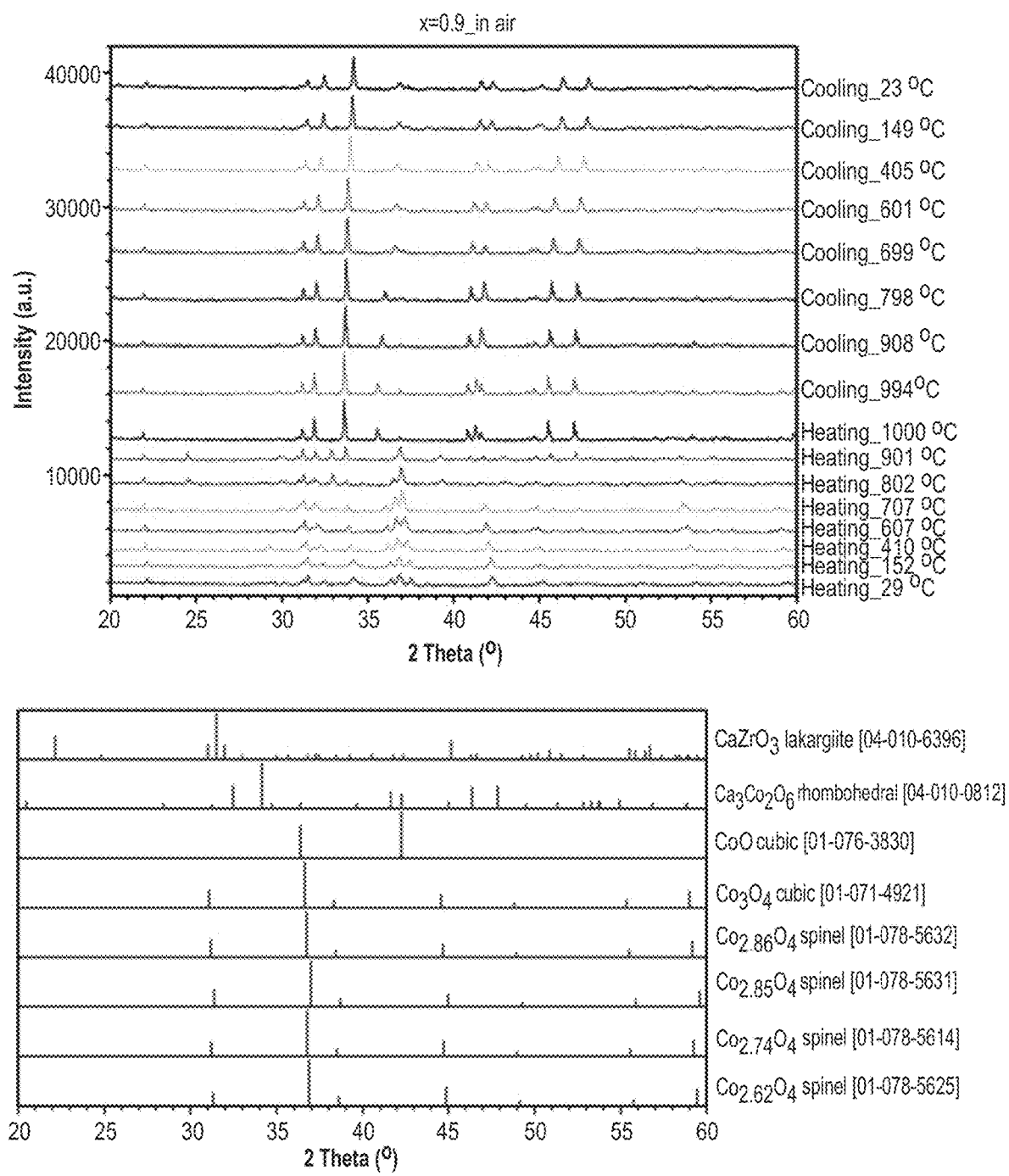
Figure 2:
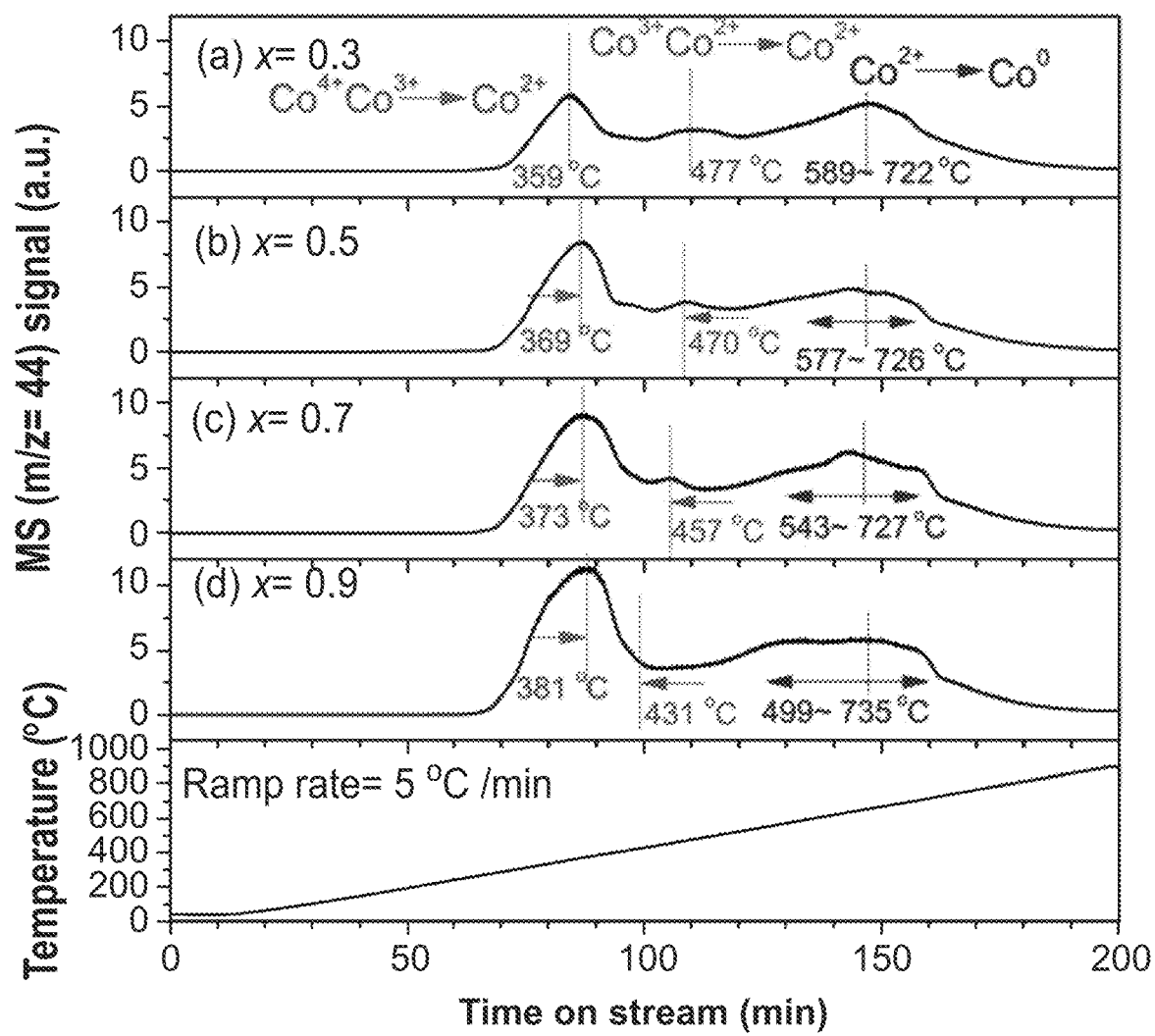
Figure 3:
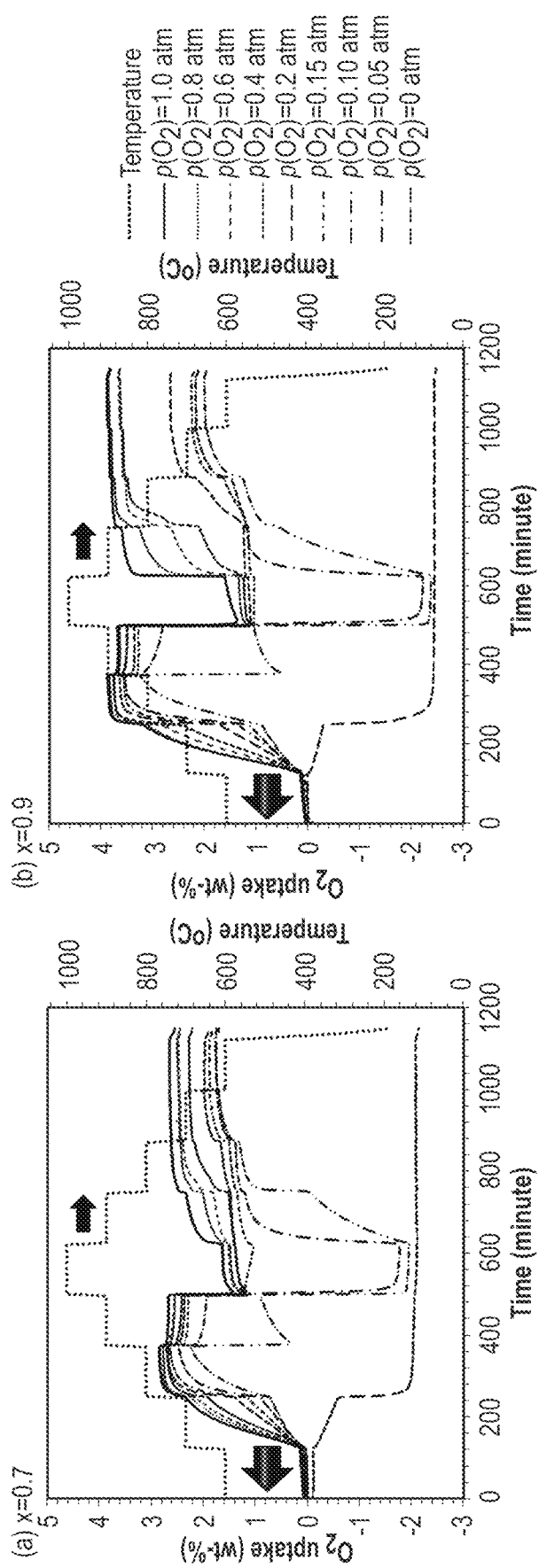
Figure 4:
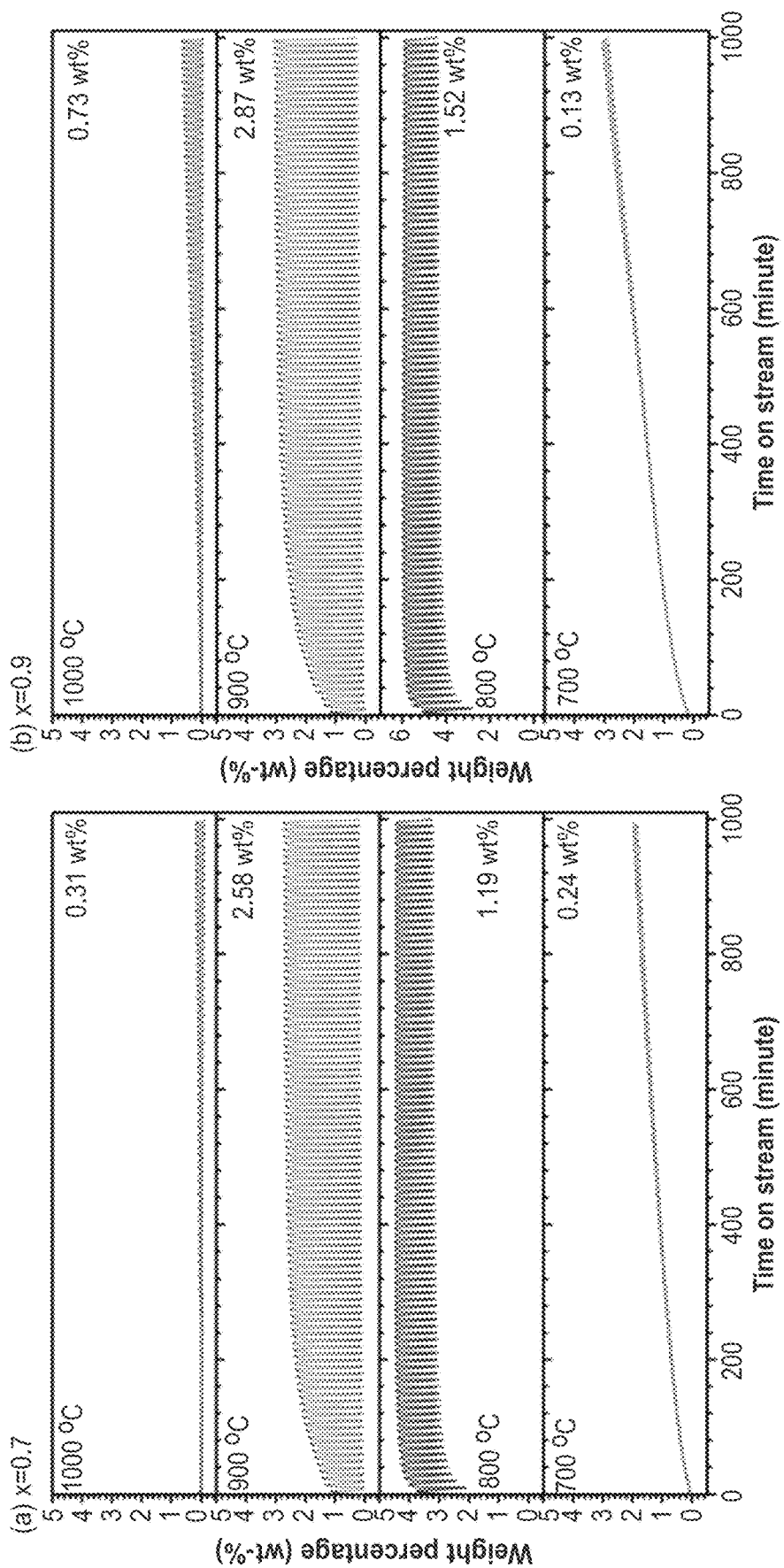
Figure 5:
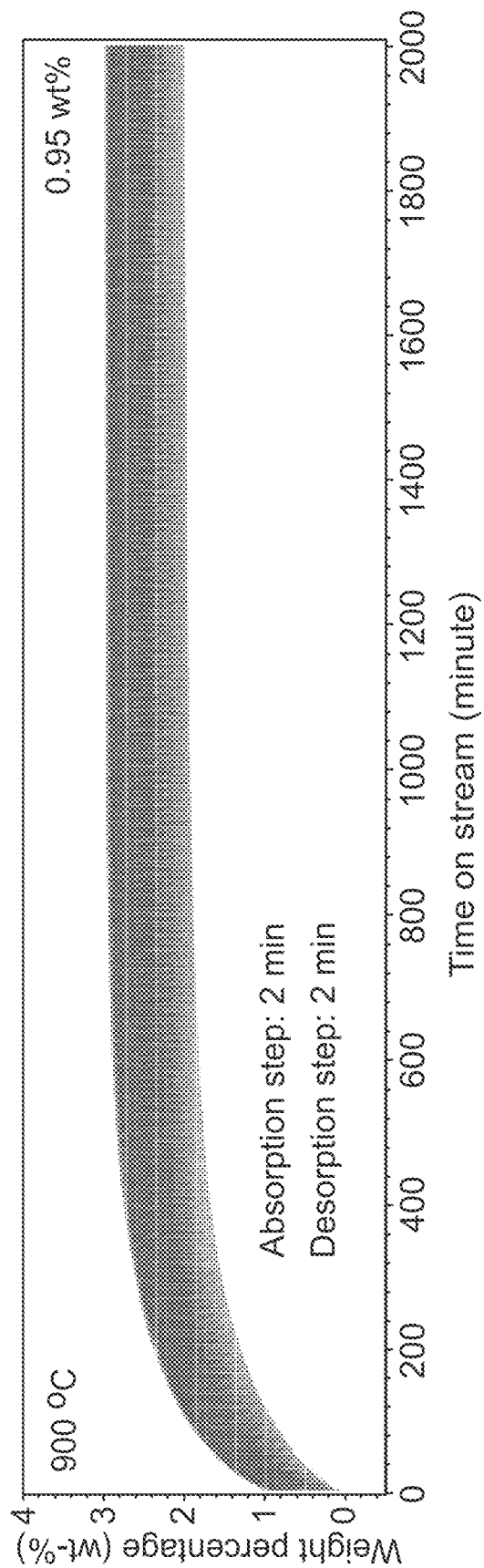
Figure 6:
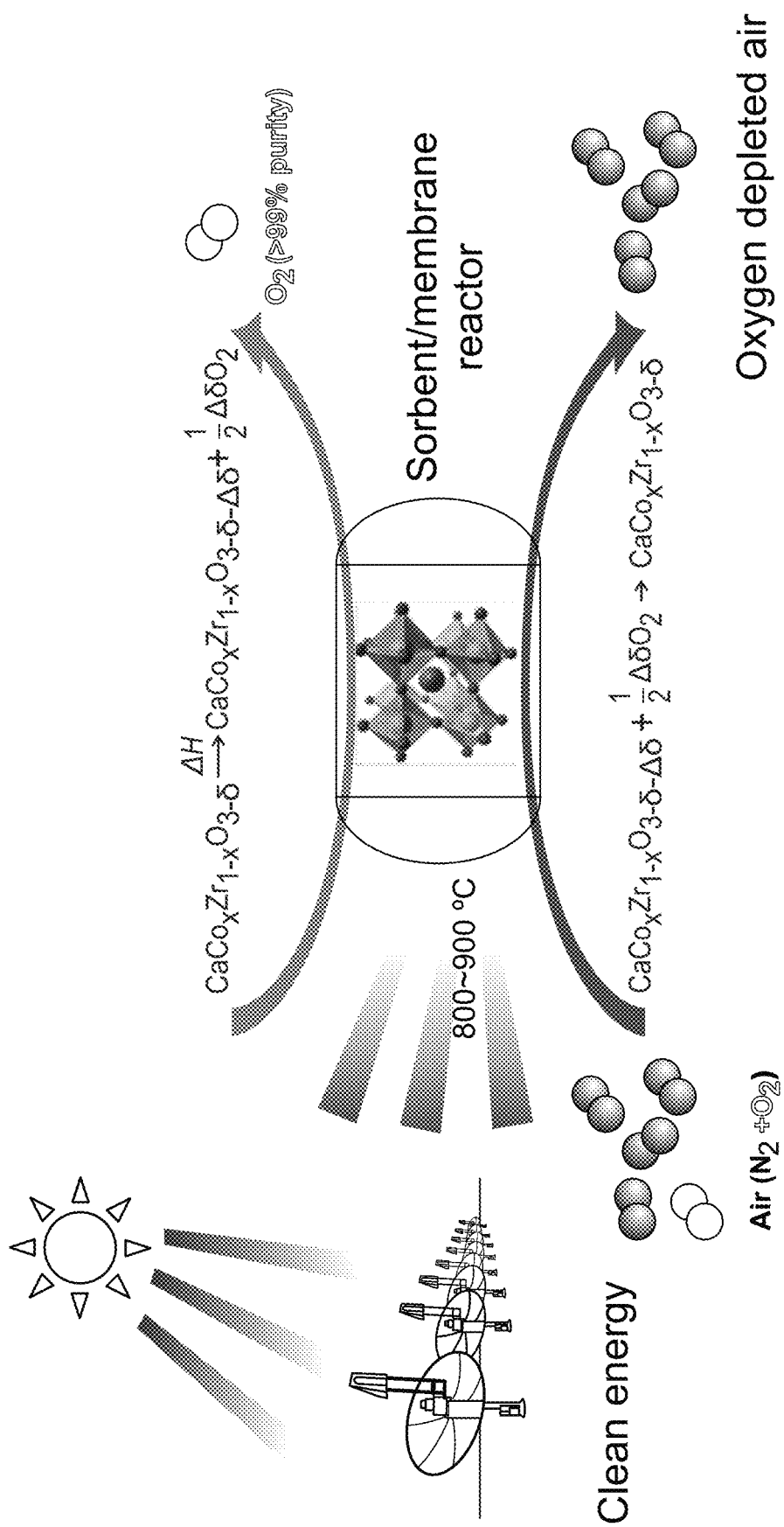

As an O$_2$ sorbent material, choosing Ca$^{2+}$ (low atomic weight) for perovskite A-site cation gives us the maximum gravimetric oxygen storage capacity, besides its promotion in oxygen vacancy formation by charge-valence balance. The schematic process of proposed thermochemical air separation using CaCo$_x$Zr$_{1-x}$O$_{3-\delta}$ perovskite as oxygen sorbent is shown in FIG. 6. At optimal temperatures 800~900° C., with thermal heat potentially provided by concentrated solar power, the perovskites can absorb/release oxygen at the same temperature to produce >99% purity O$_2$, with O$_2$-depleted air as the only by-product. Specifically, oxygen absorption takes place by filling up the oxygen vacancies in CaCo$_x$Zr$_{1-x}$O$_{3-\delta}$ by simply passing hot air through the sorbent bed. The oxygen vacancies can be subsequently re-generated by evacuation or inert purge at the same temperature.

In conclusion, the thermochemical oxygen mobility within novel CaCo$_x$Zr$_{1-x}$O$_{3-\delta}$ perovskites at higher temperature regime (600~1000° C.) is well-suited for oxygen-selective air separation application. The material structural properties were studied in combination with oxygen sorption performance testing. During in situ thermal XRD measurements, phase transitions and separations occurred during temperature-programmed heating and subsequent cooling, in N$_2$ or air atmosphere. The oxygen sorption capacity of CaCo$_x$Zr$_{1-x}$O$_{3-\delta}$ was able to be maximized by tailoring Co/Zr ratio, and process parameters including sorption temperature, oxygen partial pressure, and sorption duration. High oxygen sorption capacity was mainly attributed to B-site Co, while partial substitution of Co by Zr at B sites enhanced the perovskite structural crystallinity and thermal stability. Oxygen sorption isotherms and long-term material stability tests were performed with CaCo$_{0.7}$Zr$_{0.3}$O$_{3-\delta}$ and CaCo$_{0.9}$Zr$_{0.1}$O$_{3-\delta}$, with stable oxygen production of 2.58 wt % and 2.87 wt % respectively shown at 900° C. for 100 cycles, and 5 minutes for each sorption step. Stable material performance of CaCo$_{0.9}$Zr$_{0.1}$O$_{3-\delta}$ was further demonstrated in extended thermal cycle test with shorter sorption duration (2 minutes for each sorption step), for 500 cycles. An air separation process scheme was proposed to produce >99% purity O$_2$ by rapid absorption-desorption redox cycles using the above perovskite-type oxygen-selective sorbents.

Materials and Methods

The perovskite materials were prepared using a modified Pechini method following a procedure reported previously.[20] Generally, stoichiometric amounts of metal nitrate salts were homogeneously mixed with citric acid in ethylene glycol, with input molar ratios of n(metal):n(citric acid):n(ethylene glycol)=2:3:9. A gel was formed by heating the mixture to 150° C. A lose powder was collected for calcination at 400° C. for 4 hr. Subsequent sintering at 1200° C. for 4 hr yields a dense ceramic powder.

To study the phase transitions/separations within perovskite samples that of interest at corresponding reaction conditions, in-situ thermal XRD analyses were performed using a PANalytical Empyrean X-ray diffractometer equipped with an Anton Pan HTK 1200N high temperature oven chamber. In one set of measurements, fresh perovskite samples were first heated in N$_2$ (Ultra-high purity grade) from room temperature (25° C.) to 1000° C. at a heating rate of 3° C./min, followed by cooling in N$_2$ back to room temperature at 3° C./min. In another set of measurements, fresh samples were heated and cooled both in air (zero grade), following the same heating/cooling rate. The diffraction patterns were acquired in situ in a 2θ range of 20°-60°. Each pattern was measured using a step size of 0.0394° 2θ and count time of 1.0 s/step. The XRD contour mapping as was plotted using Python, and the structural phase identification was performed using HighScore software and its built-in ICDD database.

The perovskite redox capability was studied by CO-temperature programmed reduction (CO-TPR) using a Micromeritics AutoChem II 2920 reactor equipped with a built-in thermal conductivity detector (TCD), and with the reactor downstream connected to a benchtop quadrupole mass spectrometer (TA instrument). The TCD signal was used for the quantification of the CO intake, while the mass spectrum (MS) signal was used for product gas identification and semi-quantifiable analysis. Around 0.5 g of sample sandwiched in thin quartz wool was first loaded into a U-shaped quartz reactor, which was housed in a thermal furnace. After degassing at 500° C. for 1 hr in Helium at a flow rate of 50 mL/min, the sample was heated from ambient temperature (25° C.) to 900° C. at 5° C./min in 20% CO/He, at a flow rate of 30 mL/min, while the TCD and MS responses were recorded every 0.1 second. The TCD calibration for the total signal (reduced CO and increased CO$_2$ amount) was performed by using both the CO and CO$_2$ linear calibration curves, and 20% CO/He was used as the reference gas. A background test with an empty reactor and the same reaction condition was performed to create a baseline.

The oxygen sorption tests were performed at oxygen partial pressures (p(O$_2$)) between 0 to 1 atm, and at the same absorption/desorption temperatures between 600-1000° C., in a TGA unit (TA-50). Perovskite sample compositions of CaCo$_{0.7}$Zr$_{0.3}$O$_{3-\delta}$ and CaCo$_{0.7}$Zr$_{0.3}$O$_{3-\delta}$ were selected for the tests. In each test, p(O$_2$) was controlled by blending oxygen with nitrogen, which were separately controlled by two mass flow controllers. The total gas flow was maintained 80 mL/min. Around 25 mg of fresh sample was first loaded into the TGA, and was heated to 600° C. in Ar at 20° C./min, followed by an isothermal step for 60 min. The gas feed was then switched to O$_2$-N$_2$ blend, and the sample was maintained isothermal for 120 min, to allow equilibrium O$_2$ absorption/desorption at designated p(O$_2$). The sample was then heated to 700, 800, 900, and 1000° C., and subsequently in reverse order for cooling, with an 120 min-isothermal step at each temperature.

The perovskite long-term stability for thermal oxygen absorption-desorption at 700 to 1000° C. was examined in the same TGA unit using around 25 mg fresh sample of interest ($CaCo_xZr_{1-x}O_{3-\delta}$, x=0.7 and 0.9). The sample was first heated to designated temperature (700, 800, 900 or 1000° C.) in Argon flow (80 mL/min), followed by an isothermal step for 60 min. Cyclic thermal oxygen storage/release were carried out subsequently by switching between air and Argon flow both at 80 mL/min, each step for 5 minutes, and for 100 cycles. In another cycle test, the long-term performance of $CaCo_{0.9}Zr0.1O_{3-\delta}$ sample was evaluated at 900° C., with more frequent absorption-desorption cycles (each step for 2 minutes, and for 500 cycles).

REFERENCES

[1] A. Leo, S. Smart, S. Liu, J. C. Diniz da Costa, *J. Membr. Sci.* 2011, 368, 64-68.
[2] Q. Zheng, S. Zhou, M. Lail, K. Amato, *Ind. Eng. Chem. Res.* 2018, 57, 1954-1960.
[3] Y. Lu, H. Zhao, X. Chang, X. Du, K. Li, Y. Ma, S. Yi, Z. Du, K. Zheng, K. Swierczek, *J. Mater. Chem. A* 2016, 4, 10454-10466.
[4] B. Moghtaderi, *Energy Fuels* 2010, 24, 190-198.
[5] Q. Yang, Y. S. Lin, M. Billow, *AIChE J.* 2006, 52, 574-581.
[6] Q. Song, W. Liu, C. D. Bohn, R. N. Harper, E. Sivaniah, S. A. Scott, J. S. Dennis, *Energy Environ. Sci.* 2013, 6, 288-298.
[7] N. Miura, H. Ikeda, A. Tsuchida, *Ind. Eng. Chem. Res.* 2016, 55, 3091-3096.
[8] Z. Yang, Y. S. Lin, Y. Zeng, *Ind. Eng. Chem. Res.* 2002, 41, 2775-2784.
[9] V. Middelkoop, H. Chen, B. Michielsen, M. Jacobs, G. Syvertsen-Wiig, M. Mertens, A. Buekenhoudt, F. Snijkers, *J. Membr. Sci.* 2014, 468, 250-258.
[10] Z. Zhang, Y. Chen, M. O. Tade, Y. Hao, S. Liu, Z. Shao, *J. Mater. Chem. A* 2014, 2, 9666-9674.
[11] J. W. Lekse, S. Natesakhawat, D. Alfonso, C. Matranga, *J. Mater. Chem. A* 2014, 2, 2397-2404.
[2] M. Ezbiri, K. M. Allen, M. E. Galvez, R. Michalsky, A. Steinfeld, *ChemSusChem* 2015, 8, 1966-1971.
[13] H. Wang, S. Werth, T. Schiestel, J. Caro, *Angew. Chem. Int. Ed.* 2005, 44, 6906-6909.
[14] R. Jayathilake, B. Levitas, E. E Rodriguez, *J. Mater. Chem. A* 2018, DOI 10.1039/C7TA09823E.
[15] B. Meng, Z. Wang, X. Tan, S. Liu, *J. Eur. Ceram. Soc.* 2009, 29, 2815-2822.
[16] J. Vieten, B. Bulfin, F. Call, M. Lange, M. Schmücker, A. Francke, M. Roeb, C. Sattler, *J. Mater. Chem. A* 2016, 4, 13652-13659.
[17] C. Wu, Y. Gai, J. Zhou, X. Tang, Y. Zhang, W. Ding, C. Sun, *J. Alloys Compd.* 2015, 638, 38-43.
[18] C. Ni, J. Ni, Z. Zhou, M. Jin, *J. Alloys Compd.* 2017, 709, 789-795.
[19] J. Tong, W. Yang, B. Zhu, R. Cal, *J. Membr. Sci.* 2002, 203, 175-189.
[20] Q. Zheng, M. Lail, K. Amato, J. T. Ennis, *Catal. Today* 2019, 320, 30-39.
[21] B. Wei, Z. Lü, X. Huang, J. Miao, X. Sha, X. Xin, W. Su, *J. Eur. Ceram. Soc.* 2006, 26, 2827-2832.
[22] N. Escalona, S. Fuentealba, G. Pecchi, *Appl. Catal. Gen.* 2010, 381, 253-260.

Generalized Statements of the Disclosure

The following numbered statements provide a general description of the disclosure and are not intended to limit the appended claims.

Statement 1: A method for separating oxygen from a gas mixture which comprises (a) preparing an oxygen-depleted perovskite from a perovskite having the formula $CaCo_{1-x}Zr_xO_{3-\delta}$ wherein x is a number defined by $0.02 \leq x \leq 0.98$; and $\delta$ is a number defined by $0.0 \leq \delta \leq 1.0$; (b) contacting the oxygen-depleted perovskite under conditions such that the oxygen-depleted perovskite binds oxygen from the gas mixture and generates an oxygenated perovskite; (c) treating the oxygenated perovskite under suitable conditions so as to release the oxygen from the oxygenated perovskite; and thus (d) regenerating the oxygen-depleted perovskite and releasing the separated oxygen.

Statement 2: The method of Statement 1, wherein the conditions to release the oxygen from the oxygenated perovskite involve a pressure swing.

Statement 3: The method of Statement 1, wherein the conditions to release the oxygen from the oxygenated perovskite involve a temperature swing.

Statement 4: The method of any of Statements 1-3, wherein the gas mixture is air.

Statement 5: The method of any of Statements 1-4, wherein the gas mixture is a gas that is greater than 95% pure.

Statement 6: The method of any of Statements 1-5, wherein the perovskite has a formula wherein x is a number defined by $0.2 \leq x \leq 0.95$.

Statement 7: The method of claim 6, wherein the perovskite has a formula wherein x is a number defined by $0.4 \leq x \leq 0.95$.

Statement 8: The method of claim 7, wherein the perovskite has a formula wherein x is a number defined by $0.4 \leq x \leq 0.8$.

Statement 9: The method of any of Statements 1-8, wherein the oxygen is separated on a membrane.

Statement 10: The method of claim 9, wherein the membrane is a tubular membrane.

Statement 11: The method of claim 9, wherein the membrane is a flat membrane.

Statement 12: The method of any of Statements 1-8, wherein the oxygen is separated in a fluidized bed reactor.

Statement 13: The method of claim 12, wherein the fluidized bed reactor is a circulating fluidized bed reactor, a bubbling fluidized bed reactor, a transport reactor, or a chemical looping reactor.

Statement 14: The method of any of Statements 1-8, wherein the oxygen is separated in a fixed bed reactor.

Statement 15: The method of any of Statements 1-14, wherein the oxygenated perovskite is generated at a temperature of greater than 800° C. In some embodiments the oxygenated perovskite is generated at a temperature of about 750° C. to about 800° C., about 775° C. to about 825° C., about 750° C. to about 800° C., about 775° C. to about 825° C., about 750° C. to about 800° C., about 775° C. to about 825° C., about 800° C. to about 850° C., about 825° C. to about 875° C., about 850° C. to about 900° C., about 875° C. to about 925° C., about 900° C. to about 950° C., about 925° C. to about 975° C., about 950° C. to about 1000° C., about 975° C. to about 1025° C., or about 1000° C. to about 1050° C., or about 1025° C. to about 1075° C.

Statement 16: The method of any of Statements 1-15, wherein the oxygenated perovskite is generated at a pressure of about 1 bar to about 10 bar. In some embodiments, the pressure may be from about 1.0 to about 1.5 bar, from about 1.5 to about 2.0 bar, from about 2.0 to about 2.5 bar, from about 2.5 to about 3.0 bar, from about 3.0 to about 3.5 bar, from about 3.5 to about 4.0 bar, from about 4.0 to about 4.5 bar, from about 4.5 to about 5.0 bar, from about 5.0 to about 5.5 bar, from about 5.5 to about 6.0 bar, from about 6.0 to about 7.5 bar, from about 7.5 to about 8.0 bar, from about 8.0 to about 8.5 bar, from about 8.5 to about 9.0 bar, from about 9.0 to about 9.5 bar, or from about 9.5 to about 10.0 bar.

Statement 17: The method of any of Statements 1-16, wherein the oxygen is released from the oxygenated perovskite at a pressure of less than about 1 bar. In some embodiments the oxygen may be released at a pressure from about 1.0 to about 0.9 bar, from about 0.9 to about 0.8 bar, from about 0.8 to about 0.7 bar, from about 0.8 to about 0.7 bar, from about 0.7 to about 0.6 bar, from about 0.6 to about 0.5 bar, from about 0.5 to about 0.4 bar, from about 0.4 to about 0.3 bar, from about 0.3 to about 0.2 bar, or from about 0.2 to about 0.1 bar.

Statement 18: The method of any of Statements 1-17, wherein the oxygen-depleted perovskite is exposed to the gas mixture for a period of time ranging from about 30 seconds to about 1 hour.

Statement 19: The method of claim 1, wherein the oxygen-depleted perovskite is exposed to the gas mixture for a period of time ranging from about 1 minute to about 10 minutes.

Statement 20: The method of any of Statements 1-19, wherein the oxygen separation is part of a process to generate high purity oxygen.

Statement 21: The method of any of Statements 1-19, wherein the oxygen separation is utilized as part of a sensor for detecting oxygen.

Statement 22: A system for the separation of oxygen from a gas mixture, the system comprising: (a) a reactor configured to prepare an oxygen-depleted perovskite from a perovskite having the formula $CaCo_{1-x}Zr_xO_{3-\delta}$ wherein x is a number defined by $0.02 \leq x \leq 0.98$; and $\delta$ is a number defined by $0.0 \leq \delta \leq 1.0$; (b) a device configured to contact the oxygen-depleted perovskite with the gas mixture to generate an oxygenated perovskite; (c) a device configured to treat the oxygenated perovskite to release the oxygen and generate an oxygen-depleted perovskite; and (d) a device configured to collect the released oxygen.

Statement 23: The system of Statement 22, wherein the perovskite is in a membrane.

Statement 24: The system of Statement 23, wherein the membrane is a tubular membrane.

Statement 25: The system of Statement 23, wherein the membrane is a flat membrane.

Statement 26: The system of Statement 22, wherein the reactor is a fluidized bed reactor.

Statement 27: The system of Statement 26, wherein the fluidized bed reactor is a circulating fluidized bed reactor, a bubbling fluidized bed reactor, a transport reactor, or a chemical looping reactor.

Statement 28: The system of Statement 22, wherein the reactor is a fixed bed reactor.

Statement 29: A detector for oxygen in a gas mixture which comprises: (a) an oxygen-depleted perovskite from a perovskite having the formula $CaCo_{1-x}Zr_xO_{3-\delta}$ wherein x is a number defined by $0.02 \leq x \leq 0.98$; and $\delta$ is a number defined by $0.0 \leq \delta \leq 1.0$; (b) a device configured to contact the oxygen-depleted perovskite with the gas mixture and, if oxygen is present, to generate an oxygenated perovskite; (c) a means for detecting the oxygenated perovskite if present.

It should be understood that the above description is only representative of illustrative embodiments and examples. For the convenience of the reader, the above description has focused on a limited number of representative examples of all possible embodiments, examples that teach the principles of the disclosure. The description has not attempted to exhaustively enumerate all possible variations or even combinations of those variations described. That alternate embodiments may not have been presented for a specific portion of the disclosure, or that further undescribed alternate embodiments may be available for a portion, is not to be considered a disclaimer of those alternate embodiments. One of ordinary skill will appreciate that many of those undescribed embodiments, involve differences in technology and materials rather than differences in the application of the principles of the disclosure. Accordingly, the disclosure is not intended to be limited to less than the scope set forth in the following claims and equivalents.

INCORPORATION BY REFERENCE

All references, articles, publications, patents, patent publications, and patent applications cited herein are incorporated by reference in their entireties for all purposes. However, mention of any reference, article, publication, patent, patent publication, and patent application cited herein is not, and should not be taken as an acknowledgment or any form of suggestion that they constitute valid prior art or form part of the common general knowledge in any country in the world. It is to be understood that, while the disclosure has been described in conjunction with the detailed description, thereof, the foregoing description is intended to illustrate and not limit the scope. Other aspects, advantages, and modifications are within the scope of the claims set forth below. All publications, patents, and patent applications cited in this specification are herein incorporated by reference as if each individual publication or patent application were specifically and individually indicated to be incorporated by reference.

What is claimed is:

1. A method for separating oxygen from a gas mixture which comprises
   (a) preparing an oxygen-depleted perovskite from a perovskite having the formula $CaCo_{1-x}Zr_xO_{3-\delta}$ wherein x is a number defined by $0.02 \leq x \leq 0.98$; and $\delta$ is a number defined by $0.0 \leq \delta \leq 1.0$;
   (b) contacting the oxygen-depleted perovskite under conditions such that the oxygen-depleted perovskite binds the oxygen from the gas mixture and generates an oxygenated perovskite with bound oxygen;
   (c) treating the oxygenated perovskite under suitable conditions so as to regenerate the oxygen-depleted perovskite, release the bound oxygen from the oxygenated perovskite, and generate separated oxygen.

2. The method of claim 1, wherein the conditions to release the bound oxygen from the oxygenated perovskite involve a pressure swing.

3. The method of claim 1, wherein the conditions to release the bound oxygen from the oxygenated perovskite involve a temperature swing.

4. The method of claim 1, wherein the gas mixture is air.

5. The method of claim 1, wherein the gas mixture is a gas that is greater than 95% oxygen gas.

6. The method of claim 1, wherein the perovskite has a formula wherein x is a number defined by $0.2 \leq x \leq 0.95$.

7. The method of claim 6, wherein the perovskite has a formula wherein x is a number defined by $0.4 \leq x \leq 0.95$.

8. The method of claim 7, wherein the perovskite has a formula wherein x is a number defined by $0.4 \le x \le 0.8$.

9. The method of claim 1, wherein the oxygen of step (b) is separated on a membrane comprising the perovskite.

10. The method of claim 1, wherein the oxygen of step (b) is separated in a fluidized bed reactor.

11. The method of claim 1, wherein the oxygen of step (b) is separated in a fixed bed reactor.

12. The method of claim 1, wherein the oxygenated perovskite is generated at a temperature of greater than 800° C.

13. The method of claim 1, wherein the oxygenated perovskite is generated at a pressure of about 1 bar to about 10 bar.

14. The method of claim 1, wherein the oxygen is released from the oxygenated perovskite at a pressure of less than 1 bar.

15. The method of claim 1, wherein the oxygen-depleted perovskite is exposed to the gas mixture for a period of time ranging from about 30 seconds to about 1 hour.

16. The method of claim 1, wherein the oxygen-depleted perovskite is exposed to the gas mixture for a period of time ranging from about 1 minute to about 10 minutes.

17. The method of claim 1, wherein the oxygen separation is part of a process to generate high purity oxygen.

18. The method of claim 1, wherein the oxygen separation is utilized as part of a sensor for detecting oxygen.

19. A system for the separation of oxygen from a gas mixture, the system comprising:
  (a) a reactor configured to prepare an oxygen-depleted perovskite from a perovskite having the formula $CaCo_{1-x}Zr_xO_{3-\delta}$ wherein x is a number defined by $0.02 \le x \le 0.98$; and $\delta$ is a number defined by $0.0 \le \delta \le 1.0$;
  (b) a sorbent/membrane configured to contact the oxygen-depleted perovskite with the gas mixture to generate an oxygenated perovskite;
  (c) a temperature-swing, pressure-swing, or combined apparatus to treat the oxygenated perovskite to release the oxygen and generate an oxygen-depleted perovskite; and
  (d) a housing configured to collect the released oxygen.

20. A detector for oxygen in a gas mixture which comprises:
  (a) an oxygen-depleted perovskite from a perovskite having the formula $CaCo_{1-x}Zr_xO_{3-\delta}$ wherein x is a number defined by $0.02 \le x \le 0.98$; and $\delta$ is a number defined by $0.0 \le \delta \le 1.0$;
  (b) a sorbent/membrane configured to contact the oxygen-depleted perovskite with the gas mixture and, if oxygen is present, to generate an oxygenated perovskite; and
  (c) a apparatus for detecting the oxygenated perovskite if present.

* * * * *